July 14, 1953
R. C. OFENSTEIN ET AL
2,645,164
DEBURRING AND SWAGING MANDREL
FOR INTERIOR WALL OF TUBING
Filed April 10, 1946
2 Sheets-Sheet 1
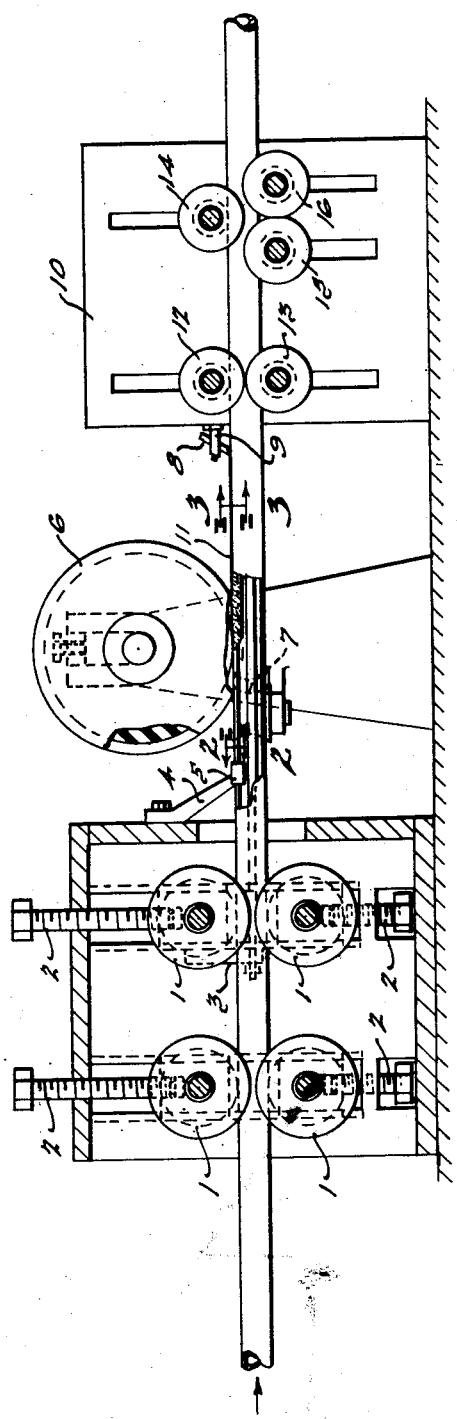
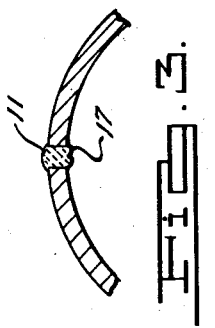
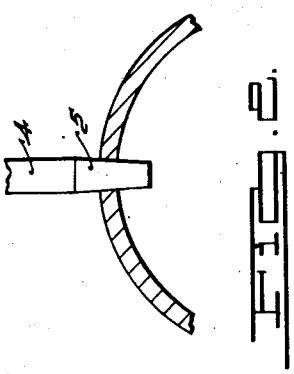
INVENTORS.
Robert C. Ofenstein.
Stanley L. Willis.
BY
Harness, Dickey & Pierce.
ATTORNEYS.

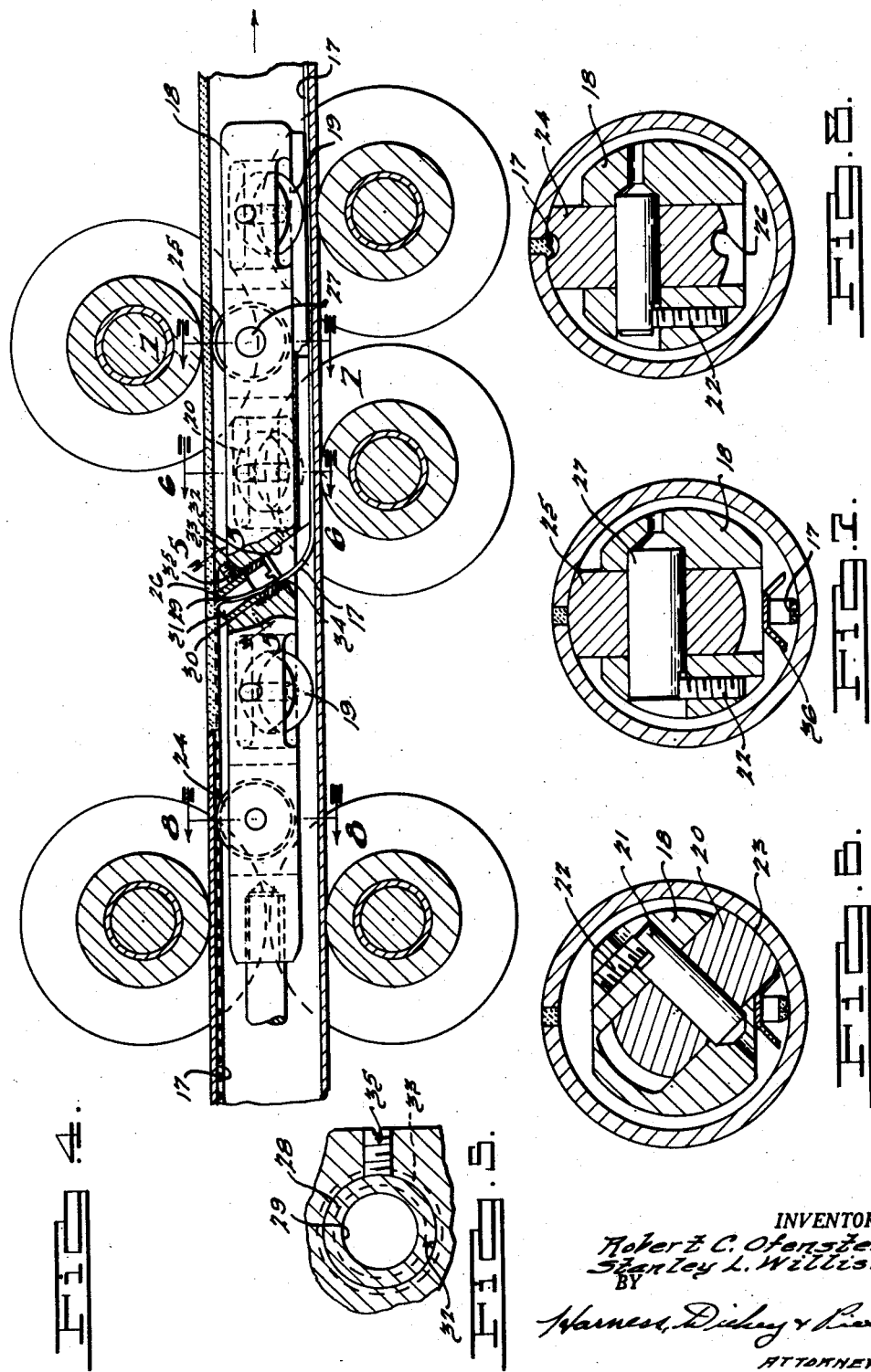

Patented July 14, 1953

2,645,164

UNITED STATES PATENT OFFICE 2,645,164

DEBURRING AND SWAGING MANDREL FOR INTERIOR WALL OF TUBING

Robert C. Ofenstein, Highland Park, and Stanley L. Willis, Detroit, Mich., assignors to The Standard Tube Company, Detroit, Mich., a corporation of Michigan Application April 10, 1946, Serial No. 661,122

4 Claims. (Cl. 90—24)

This invention relates to dressing tools, and particularly to a dressing tool for machining and swaging an internal ridge of material along the seam of a tube as it is formed.

It has been the practice in the art to construct steel tubing from a flat sheet by progressively forming the edges of the sheet upwardly as it is advanced through rollers until a tube is formed and completed by an electric resistance welding operation on the abutted edges. The seam thus formed has metal projecting upwardly from the outside and inwardly on the inside of the tube throughout the seam length. A tool is mounted on the machine for cutting the upstanding ridge of metal from the seam on the outside of the tube. For trimming the inwardly extending ridge of metal from the seam on the inside of the tube, the tool of the present invention is utilized.

The tool embodies an arbor having thereon a plurality of rollers, at least three in number, engaging the sides of the internal wall of the tube, with an additional roller having a groove for spanning the ridge of metal along the seam and aligning the tool carried by the arbor with the seam which is machined thereby. Following the cutting tool, a roller is employed for swaging the machined area along the seam so that a smooth continuous internal surface is provided within the resulting tube.

The cutting tool is preferably made of tubular stock having the inner edge relieved toward the outer edge so as to have the inner edge form the cutting portion of the tool. As the inwardly projected material is cut from the seam, it is directed downwardly through the cutting tool against the inner bottom wall of the tube where it is confined in an inverted trough element carried by the arbor so as to be carried along with the tube as the tube continues to advance.

The tool is attached to a rod which extends ahead of the rollers which produces the abutting engagement of the tube edges so that it may project from the tube and be supported on the frame of the machine. The machine for advancing and forming the strip of material into the tube and for welding the abutted edges is of conventional construction. The present invention pertains to the tool for dressing the inwardly projecting ridge of metal of the seam from the inner wall of the tube and for swaging the surface so dressed.

Accordingly, the main objects of the invention are: to provide a device for machining the inwardly projecting ridge of metal at the seam of a tube as the tube is advanced over the tool; to provide a device with a tubular cutting tool having its inner peripheral edge relieved to form the cutting edge by which the inwardly projecting ridge of metal on the seam is machined and directed through the hollow interior of the cutting tool to the bottom of the tube to be carried along with the tube as the tube advances; to provide an arbor with stabilizing rollers which engage the inner surface of a tube and with a roller having a groove which spans the projecting ridge of metal along the seam for maintaining the arbor and cutting tool thereof aligned with the ridge which is cut by the tool having a hollow interior through which the strip of metal severed from the ridge is directed to the bottom of the tube and carried along therewith as the tube is advanced over the arbor; to provide an arbor having rollers which support the arbor spaced from the wall of the tube and having an upwardly extending roller provided with a groove for straddling the ridge of material at the seam and aligning it with a cutting tool which severs the ridge of material and directs it to the bottom of the arbor as an additional wheel on the arbor aligned with the tool performing a swaging operation on the machined surface; and, in general, to provide an internal finishing tool for a tube which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken view, with parts in section, of a tube rolling machine having mounted thereon a dressing arbor for the inner surface of the formed tube, embodying features of this invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the right-hand end portion of the structure illustrated in Fig. 1;

Fig. 5 is an enlarged sectional view of the structure illustrated in Fig. 4, taken on the line 5—5 thereof;

Fig. 6 is an enlarged sectional view of the structure illustrated in Fig. 4, taken on the line 6—6 thereof;

Fig. 7 is an enlarged sectional view of the structure illustrated in Fig. 4, taken on the line 7—7 thereof, and Fig. 8 is an enlarged sectional view of the structure illustrated in Fig. 4, taken on the line 8—8 thereof.

The finishing end of a tube forming machine is illustrated in Fig. 1 wherein a continuously fed strip of material is rolled into substantially tubular form. The plurality of rollers 1 are adjusted in predetermined relation to each other by the hold-down bolts 2 for further rolling up the edges of the tube toward each other. The edges, however, are retained in spaced relation to permit a tool supporting arm 3 to project between the edges into the internal area of the tube. An arm 4, supported on the machine, has a seam spacing finger 5 thereon which retains the seam edges spaced from each other just ahead of the welding wheel 6. Directly ahead of the welding wheel is a pair of rollers 7 which engage the side portions of the tube for moving the edges into abutting relation just prior to the passage of the tube under the wheels 6. As the tube passes under the wheel, the pressure against the edges causes the edges to move toward each other as the metal becomes heated to a welding temperature by the application of current thereto by the wheel 6 which causes the metal of the edge to be forced inwardly and outwardly at the seam while maintaining the predetermined diameter to the resulting tube.

A cutting tool 8 is suitably supported on a mounting member 9 on the frame 10 of the machine for cutting the outwardly projecting rib portion 11, as illustrated in Fig. 3, from the seam of the tube. The tube is thereafter advanced through the pair of rollers 12 and 13 and a series of rollers 14, 15 and 16 supported on the frame 10. The portion of the machine so far described is of conventional form as the actual rolling of the sheet into the tube and the machining of the outwardly extending rib of material along the seam were known in the art prior to applicant's invention.

Applicant's invention pertains to the device for finishing the inner surface of the tube by dressing the ridge of material projecting inwardly of the seam and by burnishing the surface thereafter. The ridge of material 17 on the inner surface of the tube is illustrated clearly in Fig. 3 of the drawing.

Referring more specifically to Figs. 4 to 8 inclusive, the device for dressing the ridge 17 from the inner surface of the tube is illustrated in detail. An arbor 18 has a pair of spaced aligned rollers 19, with a third roller 20 disposed therebetween and approximately 90° therefrom. The rollers are mounted on stub shafts 21 which are retained against rotation by a setscrew 22 engaging a shoulder on the shaft. The rollers have segmental spherical surfaces 23 on the peripheral edge of the same of slightly less radius than the radius of the tube so as to contact the surface with a substantial area of engagement without harming the interior surface thereof. The three rollers 20 support the arbor against downward deflection on the inner tube surface. A pair of vertically extending rollers 24 and 25 projects upwardly from the arbor. The roller 24, as illustrated in Fig. 8, is similar to roller 20 with the exception that a peripheral groove 26 is provided therein. This groove, as illustrated in the figure, straddles the ridge 17. The roller 24 maintains the arbor 18 aligned with the inwardly projecting rib. The second wheel 25 is illustrated in Fig. 7 as being similar to the wheel illustrated in Fig. 8. This wheel is mounted on a stub shaft 27 of greater diameter than the shafts on the wheels 19, 20 and 24 because of the greater pressure exerted on the wheel. The wheel is employed to swage the surface after the ridge 17 has been machined therefrom to provide a smooth continuous surface throughout the inner peripheral wall of the tube.

Between the wheels 19 and 20, a cutting tool 28 is employed, being of tubular form having a central passageway 29 and a sloping end wall 30 which provides relief to the resulting cutting edge 31 at the terminal end of the inner wall. The arbor has an angular aperture 32, the lower portion of which is provided with a thread 33 in which a tubular threaded adjusting element 34 is mounted. This element backs up the cutting element 28 when inserted in the aperture 32 and is the means by which the cutting portion of the tool is adjusted to regulate the depth of cut to be taken from the ridge 17. After adjustment is made, a setscrew 35 is tightened to prevent the cutting tool 28 from rotating in the aperture 32, and by this adjustment the cutting tool is retained in cutting position until the cutting area thereof becomes dulled. Thereafter the cutting tool is rotated and again clamped by the setscrew 35 to advance a sharp cutting edge into position of engagement with the ridge of material 17. It will be noted from Fig. 5 that the material 17, after being severed from the seam, is directed downwardly through the passageway 29 of the tool 28 and the tubular adjusting element 34 to rest upon the opposite wall of the tube, that is to say, the bottom of the tube.

Referring again to Figs. 4, 6 and 7, a channel element 36 is illustrated mounted on the bottom of the arbor 18 extending from the aperture 32 to the right, as viewed in the figure, in the direction in which the tube is advancing. The channel element 36 functions as a guide for the strip of removed ridge 17 as it is carried under the arbor along with the tube and prevents the strip from clogging up the arbor and rollers, which might otherwise occur.

It will be noted further from Fig. 4 that the roller 15 has its vertical axis aligned with the axis of the vertical roller 20 and that the roller 16 has its center aligned with the center of the roller 19 and also that the roller 14 has its center aligned with that of the roller 25. The position of the rollers is such that a substantial force may be applied to the wall of the tube when the roller 25 swages the surface from which the ridge of material 17 was severed without distorting the tube. The position of the rollers 14, 15 and 16 directly opposite to the application of the forces to opposite sides of the tube wall prevents any damage to the tube. The tool of the present invention is capable of machining the inner projecting ridge of material at the seam line of the tube and swaging the metal of the seam thereafter to provide a smooth continuous inner surface to the tube.

What is claimed is:

1. A device for finishing the internal surface of a tube having a welded seam including, in combination, an arbor, rollers on said arbor for supporting the arbor within the tube, said arbor having a tool supporting aperture disposed in acute angular relation with the vertical axis of the arbor, a tubular tool having the inner edge relieved outwardly, and means for supporting said tool in said arbor positioned to have a portion only of said cutting edge in position to cut the material projecting from the seam of the tube which thereafter passes through said tool.

2. A device for removing a ridge extending inwardly from the interior surface of a tube, including a combination, an arbor having a tool supporting aperture extending therethrough at an angle to the arbor axis, a tubular cutting tool having the inner edge relieved outwardly forming an angle with the cutter axis which is less than that between the axis and the inner surface of the tube being machined, a thread in said aperture, and a tubular element having an external thread in engagement with said first thread for backing up and adjusting the position of the cutting tool in said aperture, whereby the material of said ridge cut by said tool passes therethrough and through the threaded tubular element.

3. A device for removing a ridge extending inwardly from the interior surface of a tube, including a combination, an arbor having a tool supporting aperture extending therethrough at an angle to the arbor axis, a tubular cutting tool having the inner edge relieved outwardly forming an angle with the cutter axis which is less than that between the axis and the inner surface of the tube being machined, a thread in said aperture, a tubular element having an external thread in engagement with said first thread for backing up and adjusting the position of the cutting tool in said aperture, and means for locking the cutting tool in the aperture in said arbor after adjustment, whereby the material of said ridge cut by said tool passes therethrough and through the threaded tubular element.

4. A device for removing a ridge extending inwardly from the interior surface of a tube, including a combination, an arbor having a tool supporting aperture extending therethrough at an angle to the arbor axis, a tubular cutting tool having the inner edge relieved outwardly forming an angle with the cutter axis which is less than that between the axis and the inner surface of the tube being machined, a thread in said aperture, a tubular element having an external thread in engagement with said first thread for backing up and adjusting the position of the cutting tool in said aperture, a burnishing roller carried by said arbor aligned with the tool, and supporting rollers for said arbor disposed on either side of a plane through said ridge and the axis of the tube to provide an area diametrically opposite to said ridge for the reception of the material cut therefrom by said tool which passes through said tool and through said threaded tubular element.

ROBERT C. OFENSTEIN.
STANLEY L. WILLIS.

References Cited in the file of this patent

UNITED STATES PATENTS

| Number | Name | Date |
|---|---|---|
| Re. 20,439 | Rippel | July 6, 1937 |
| 1,884,467 | Windsor | Oct. 25, 1932 |
| 1,954,511 | Adams | Apr. 10, 1934 |
| 2,025,422 | Park | Dec. 24, 1935 |
| 2,061,581 | Lippincott | Nov. 24, 1936 |
| 2,076,062 | Berg et al. | Apr. 6, 1937 |
| 2,286,513 | Sower | June 16, 1942 |

FOREIGN PATENTS

| Number | Country | Date |
|---|---|---|
| 35,364 | Switzerland | Dec. 19, 1905 |
| 204,953 | Great Britain | Oct. 11, 1923 |